JAMES HOPKINS.
Improvement in Animal Pokes.
No. 115,319. Patented May 30, 1871.
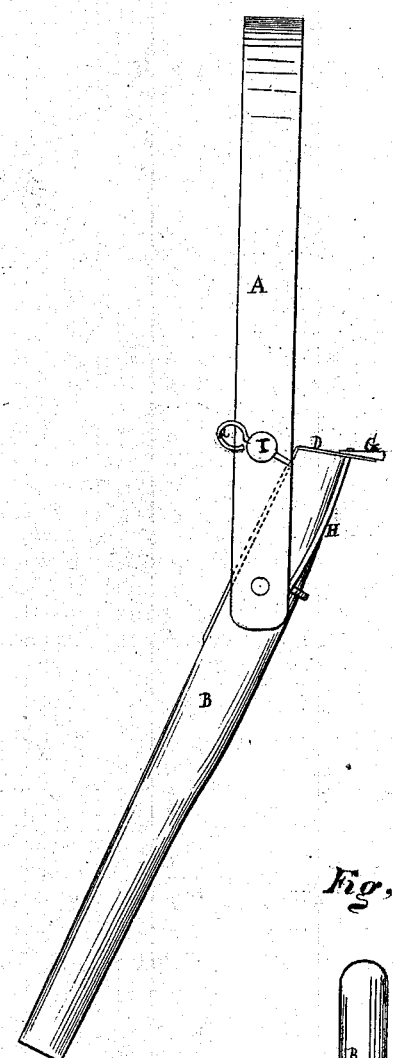
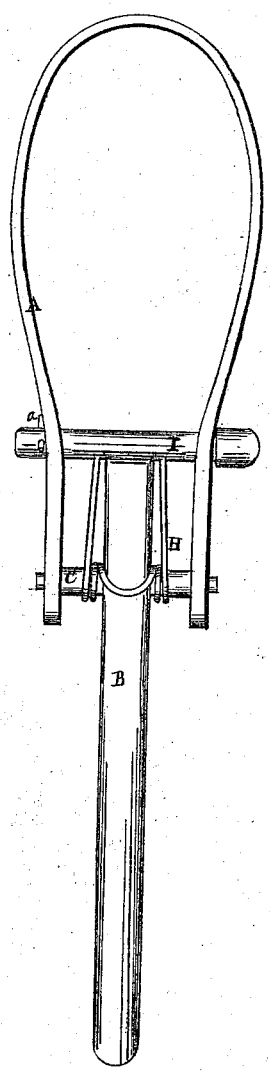
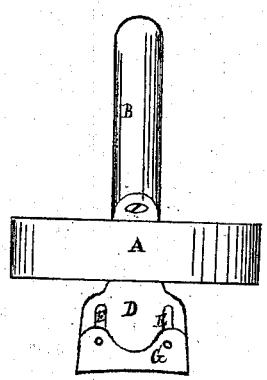
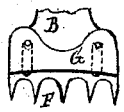

115,319

UNITED STATES PATENT OFFICE.

JAMES HOPKINS, OF AKRON, OHIO.

IMPROVEMENT IN ANIMAL-POKES.

Specification forming part of Letters Patent No. 115,319, dated May 30, 1871.

*To all whom it may concern:*

Be it known that I, JAMES HOPKINS, of Akron, in the county of Summit and State of Ohio, have invented certain new and useful Improvements in Animal-Poke, of which the following is a full and complete description, reference being had to the accompanying drawing making a part of this specification, in which—

Figure 1 is a side view of the poke. Fig. 2 is a back view. Fig. 3 is a view of the upper side. Fig. 4 is a detached section.

Like letters of reference refer to like parts in the several views.

The nature of this invention relates to an animal-poke: and the object thereof is to prevent breachy horses and other animals from leaping fences, &c.

The construction and operation of said poke are as follows:

A, Fig. 1, represents a yoke or bow, to the lower end of which is hung a stale, B, by means of the round C, whereby said stale is allowed a vibrating movement. To the upper end of the stale is secured a spear-plate, D, Fig. 3, having slotted holes E therein, and the outer edge armed with sharp teeth F, Fig. 4. To the upper side of said plate is attached a guard-plate, G, by means of the spring H, coiled about the round C of the stale, as shown. The ends of said spring pass through the slots E and enter the guard-plate, and are riveted thereto, as shown in Fig. 1.

The practical operation of the above-described device is as follows: The poke is secured to the animal by placing the yoke or bow around its neck, which may be done by withdrawing the pin *a* from the round or bolt I, which will allow the bolt to be withdrawn or one side of the bow to spread out, so that it can be placed on the animal's neck. The position of the poke when on the animal is such as shown in Fig. 1. As the creature may come near the fence the end of the stale will come in contact therewith. Now, as the horse may push the stale against the fence its breast will crowd against the edge of the guard-plate G, forcing it back from over the teeth F, which will now be exposed and pierce the animal, and cause it to retreat in consequence of the pain inflicted by the sharp teeth of the plate D. The guard-plate, on the removal of the pressure of the breast upon it, will move forward and again cover the teeth by means of the spring, to which it is secured as above described, thereby protecting the breast of the horse from further injury.

*Claim.*

What I claim as my invention, and desire to secure by Letters Patent, is—

The adjustable guard-plate G, and spear-plate provided with slots E, attached to the end of the stale B, as arranged and in combination with the spring H, stale B, yoke A, round C, and bolt I, operating conjointly, substantially as and for the purpose set forth.

JAMES HOPKINS.

Witnesses:
   J. H. BURRIDGE,
   D. L. HUMPHREY.